(12) United States Patent
Han et al.

(10) Patent No.: US 10,862,554 B2
(45) Date of Patent: *Dec. 8, 2020

(54) METHOD AND APPARATUS FOR MANAGING CONTROL CHANNEL IN A MOBILE COMMUNICATION SYSTEM USING MULTIPLE ANTENNAS

(71) Applicant: Samsung Electronics Co., Ltd., Gyeonggi-do (KR)

(72) Inventors: Jin-Kyu Han, Seoul (KR); Hwan-Joon Kwon, Gyeonggi-do (KR); Dong-Hee Kim, Gyeonggi-do (KR); Jae-Chon Yu, Gyeonggi-do (KR); Yeon-Ju Lim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 15/727,038

(22) Filed: Oct. 6, 2017

(65) Prior Publication Data

US 2018/0034520 A1    Feb. 1, 2018

Related U.S. Application Data

(63) Continuation of application No. 14/864,320, filed on Sep. 24, 2015, now Pat. No. 9,787,380, which is a
(Continued)

(30) Foreign Application Priority Data

Jan. 12, 2007   (KR) ......................... 10-2007-0003579

(51) Int. Cl.
*H04B 7/0456*     (2017.01)
*H04L 1/06*       (2006.01)
(Continued)

(52) U.S. Cl.
CPC ......... *H04B 7/0456* (2013.01); *H04L 1/0625* (2013.01); *H04L 5/0051* (2013.01); *H04B 7/0617* (2013.01); *H04B 7/0669* (2013.01)

(58) Field of Classification Search
None
See application file for complete search history.

(56) References Cited

U.S. PATENT DOCUMENTS 6,674,739 B1    1/2004 Lee et al.
7,286,500 B1 *  10/2007 Bhatoolaul ............ H04B 1/707
                                                         370/320
(Continued)

FOREIGN PATENT DOCUMENTS

KR    1020050114165    12/2005
KR    1020060016192     2/2006
WO    WO 01/80579      10/2001

OTHER PUBLICATIONS

Lucent et al., "Harmonized Proposal on LBC MIMO", Jan. 8, 2007, 3rd Generation Partnership Project 2, pp. 1-18.
(Continued)

*Primary Examiner* — Bunjob Jaroenchonwanit
(74) *Attorney, Agent, or Firm* — The Farrell Law Firm, P.C.

(57) ABSTRACT

Methods and apparatuses are provided for receiving control information by a terminal. A control channel message is received on a control channel. Control information comprising a transmission rank and precoding matrix information is extracted from the control channel message if a common pilot is used for data demodulation. The control information comprising the transmission rank and information about a dedicated pilot is extracted from the control channel message if the dedicated pilot is used for the data demodulation.

16 Claims, 10 Drawing Sheets

Related U.S. Application Data continuation of application No. 14/325,995, filed on Jul. 8, 2014, now Pat. No. 9,312,936, which is a continuation of application No. 12/013,711, filed on Jan. 14, 2008, now Pat. No. 8,774,152.

(51) Int. Cl.
*H04L 5/00* (2006.01)
*H04B 7/06* (2006.01)

(56) References Cited

U.S. PATENT DOCUMENTS

| | | | |
|---|---|---|---|
| 7,564,829 B2 | 7/2009 | Jin et al. | |
| 7,660,607 B2 | 2/2010 | Oh et al. | |
| 7,751,838 B2 | 7/2010 | Ramesh et al. | |
| 8,194,781 B2 * | 6/2012 | Han | H04L 1/0625 375/260 |
| 8,774,152 B2 * | 7/2014 | Han | H04L 5/0051 370/342 |
| 9,787,380 B2 * | 10/2017 | Han | H04L 5/0051 |
| 2003/0185159 A1 * | 10/2003 | Seo | H04L 1/0026 370/278 |
| 2004/0062299 A1 * | 4/2004 | McDonough | H04B 1/708 375/150 |
| 2004/0071193 A1 * | 4/2004 | Atarashi | H04B 1/7113 375/144 |
| 2004/0101071 A1 * | 5/2004 | Naito | H04L 1/0039 375/340 |
| 2005/0136841 A1 | 6/2005 | Frank | |
| 2005/0254414 A1 * | 11/2005 | Suda | H04L 27/2647 370/203 |
| 2007/0098053 A1 | 5/2007 | Rinne et al. | |
| 2007/0174038 A1 | 7/2007 | Wang et al. | |
| 2007/0195736 A1 | 8/2007 | Taira et al. | |
| 2007/0195738 A1 | 8/2007 | Kim | |
| 2007/0293172 A1 | 12/2007 | Shi et al. | |
| 2008/0043867 A1 | 2/2008 | Blanz et al. | |
| 2008/0049861 A1 * | 2/2008 | Yang | H04L 1/0079 375/262 |
| 2008/0181181 A1 | 7/2008 | Gorokhov et al. | |
| 2008/0232504 A1 * | 9/2008 | Ma | H04L 5/0023 375/267 |
| 2009/0219838 A1 | 9/2009 | Jia et al. | |
| 2010/0085912 A1 | 4/2010 | Chun et al. | |
| 2010/0172397 A1 * | 7/2010 | Kent | H04B 7/06 375/148 |
| 2010/0323739 A1 * | 12/2010 | Wan | H04L 1/0026 455/513 |
| 2011/0064156 A1 | 3/2011 | Kim et al. | |
| 2012/0008584 A1 * | 1/2012 | Higuchi | H04L 5/0053 370/329 |

OTHER PUBLICATIONS

Lg et al., "F-SCCH Signaling Modification to Support STTD Scheme for Selected Antennas", Jan. 11, 2007, 3rd Generation Partnership Project 2, pp. 1-4.
Alexei Gorokhov, "Forward Link Signaling Enhancements for LBC FDD", p. 2-11, Oct. 31, 2006.

* cited by examiner

METHOD AND APPARATUS FOR MANAGING CONTROL CHANNEL IN A MOBILE COMMUNICATION SYSTEM USING MULTIPLE ANTENNAS

PRIORITY

This application is a Continuation of Application of U.S. patent application Ser. No. 14/864,320, filed in the U.S. Patent and Trademark Office (USPTO) on Sep. 24, 2015, which is a Continuation Application of U.S. patent application Ser. No. 14/325,995, filed in the USPTO on Jul. 8, 2014, now U.S. Pat. No. 9,312,936, issued on Apr. 12, 2016, which is a Continuation Application of U.S. patent application Ser. No. 12/013,711, filed in the USPTO on Jan. 14, 2008, now U.S. Pat. No. 8,774,152, issued on Jul. 8, 2014, which claims priority under 35 U.S.C. § 119(a) to a Korean Patent Application filed in the Korean Intellectual Property Office on Jan. 12, 2007 and assigned Serial No. 10-2007-0003579, the disclosure of which is incorporated herein by reference.

BACKGROUND OF THE INVENTION

1. Field of the Invention

The present invention relates generally to a method and apparatus for managing forward control channels in a mobile communication system, and more particularly, to a method and apparatus for transmitting/receiving data over a Forward Shared Control Channel (F-SCCH), adapted to support various antenna technologies for data transmission in a forward link of a mobile communication system using multiple transmit/receive antennas.

2. Description of the Related Art

The mobile communication system has evolved into a high-speed, high-quality wireless packet data communication system that provides data services and multimedia services in addition to the early voice-oriented services. Recently, various mobile communication standards, such as High Speed Downlink Packet Access (HSDPA) and High Speed Uplink Packet Access (HSUPA), both defined in $3^{rd}$ Generation Partnership Project (3GPP), High Rate Packet Data (HRPD) defined in $3^{rd}$ Generation Partnership Project-2 (3GPP2), and IEEE 802.16, have been developed to support the high-speed, high-quality wireless packet data communication services.

The existing $3^{rd}$ Generation wireless packet data communication systems, such as HSDPA, HSUPA and HRPD, use technologies of an Adaptive Modulation and Coding (AMC) method and a channel-sensitive scheduling method to improve the transmission efficiency.

With the use of the AMC method, a transmitter can adjust the amount of transmission data according to the channel state. That is, when the channel state is not 'Good', the transmitter reduces the amount of transmission data to adjust the reception error rate to a desired level, and when the channel state is 'Good', the transmitter increases the amount of transmission data to adjust the reception error rate to the desired level and to efficiently transmit a large volume of information.

With the use of the channel-sensitive scheduling-based resource management method, the transmitter selectively services the user having a good channel state among several users, thus increasing the system capacity compared to the method of assigning a channel to one user and servicing the user with the assigned channel.

The capacity increase is referred to as 'multi-user diversity gain'. In sum, the AMC method and the channel-sensitive scheduling method are methods of applying the appropriate modulation and coding techniques at the most-efficient time determined depending on the partial channel state information fed back from a receiver.

To realize the AMC method and the channel-sensitive scheduling method, the receiver should feed back the channel state information to the transmitter. The channel state information that the receiver feeds back in this way is referred to herein as a 'Channel Quality Indicator (CQI)'.

Recently, intensive research has been conducted to replace Code Division Multiple Access (CDMA), the multiple access scheme used in the $2^{nd}$ and $3^{rd}$ generation mobile communication systems, with Orthogonal Frequency Division Multiple Access (OFDMA) in the next generation system. 3GPP and 3GPP2 have started their standardizations on the evolved systems employing OFDMA. It is generally known that the OFDMA scheme, compared to the CDMA scheme, can expect the capacity increase. One of the several causes bringing about the capacity increase in the OFDMA scheme is that the OFDMA scheme can perform scheduling in the frequency domain (Frequency Domain Scheduling). As though the transceiver acquires capacity gain according to the time-varying channel characteristic using the channel-sensitive scheduling method, the transceiver can obtain the higher capacity gain with use of the frequency-varying channel characteristic. However, to support the frequency domain scheduling, the transmitter should previously acquire channel state information separately for each frequency. That is, the transmitter needs CQI feedback information for each frequency, causing an increase in the load due to the CQI feedback transmission.

In the next generation system, intensive research is being conducted on the introduction of Multiple Input Multiple Output (MIMO) technology employing multiple transmit/receive antennas. The term 'MIMO' as used herein refers to a technology that simultaneously transmits multiple data streams over the same resources using multiple transmit/receive antennas. It is well known that when the channel state is 'Good,' it is possible to increase the throughput at the same error rate by transmitting multiple low-modulation order data streams rather than increasing the modulation order. In the MIMO technique, the dimension over which an individual data stream is transmitted is referred to as a 'layer', and the method that applies AMC separately according to the channel state of the layer is efficient in increasing the capacity. For example, Per Antenna Rate Control (PARC) is a technology in which every transmit antenna transmits a different data stream, and in this technology, the layer is a transmit antenna. The multiple transmit antennas experience different channels, and the PARC technique applies AMC such that a larger amount of data can be transmitted via the transmit antenna having a good channel state and a less amount of data can be transmitted via the transmit antenna having a poor channel state. As another example, in Per Common Basis Rate Control (PCBRC) the layer is a fixed transmission beam. Therefore, the PCBRC technique transmits a greater amount of data over the transmission beam with a good channel state, and transmits a less amount of data over the transmission beam with a poor channel state.

Commonly, the packet mobile communication system using multiple antennas transmits/receives control information using a Forward Shared Control Channel (F-SCCH).

The F-SCCH is a channel transmitted along with the transmission data when data is transmitted to an arbitrary terminal at an arbitrary time, and this channel is characterized by including the control information necessary for demodulation of the transmission data. Using Table 1 below, the constituent fields of F-SCCH will be considered. Table 1 shows a message format of the shared control channel, and the message is transmitted over the shared control channel. Besides the fields defined in Table 1, other fields used for performing other functions can be added to the shared control channel, and/or the number of bits used for expressing each of the fields is subject to change.

TABLE 1

| Field | Block type | MACID | Persistent | ChanID | PF | Ext. TX | Rank |
|---|---|---|---|---|---|---|---|
| # bits | 2 | 9-11 | 1 | 6-8 | 4-6 | 1 | 2 |
| FLAM | 00 | 1 | 1 | 1 | 1 | 1 | 0 |
| MCW FLAM1 | 01 | 1 | 1 | 1 | 1 | 1 | 0 |
| MCW FLAM2 | 10 | 1 | 0 | 0 | 3 | 1 | 0 |
| SCW FLAM | 11 | 1 | 1 | 1 | 1 | 1 | 1 |

Referring to Table 1, 'Block type' is a field indicating a type of the message. 'MAC ID' is a field indicating an identifier (ID) of a terminal. That is, after receiving a shared control channel, the terminal checks MAC ID included in the received shared control channel to determine whether the received MAC ID is equal to a MAC ID previously agreed upon between the terminal and a base station, and thus determines whether there is any data being transmitted to the terminal itself. Although the MAC ID is included in the message of the shared control channel in Table 1, by way of example, the MAC ID can also be transmitted by scrambling the message of the shared control channel using a MAC ID-specific scrambling sequence of the target user. A 'Persistent' field is a field indicating whether the resource assigned to the terminal itself is persistent resource or non-persistent resource.

'Channel Identifier (ChanID)' is a field indicating an identifier for the assigned resource. 'Packet Format (PF)' is a field for notifying a modulation order, such as QPSK, 8PSK and 16QAM, used for data transmission, and a code rate. 'Extended Transmission (Ext. Tx)' is information indicating a time length of transmission data. 'Rank' indicates the number of data streams transmitted via multiple antennas. 'Forward Link Assignment Message (FLAM)' indicates that the message is a message for resource assignment for the forward link.

'Multi CodeWord (MCW)' indicates that when multiple data streams are transmitted via multiple antennas, the multiple data streams are streams that have undergone channel coding (for example, turbo coding) independently of each other. 'Single CodeWord (SCW)' indicates that when multiple data streams are transmitted via multiple antennas, the multiple data streams are parts of one codeword that has undergone channel coding.

In Table 1, numerals shown in the shaded blocks indicate whether each of the message types include a particular field. For example, FLAM has a Rank field=0, but SCW FLAM includes the Rank field. This means that the FLAM, as it is a message type used for Single Input Multiple Output (SIMO) transmission, does not need the Rank field used for transmission of multiple data streams, whereas the SCW FLAM needs the Rank information as multiple data streams can be transmitted.

However, the message format of the foregoing conventional shared control channel does not support precoding and/or various types of pilot patterns. When a common pilot is used, it is necessary to separately notify which precoding is applied thereto, because the pilot has not undergone precoding. However, when a dedicated pilot is used, it is necessary to separately notify which pilot pattern is used therefor. The conventional technology, however, gives no definition of the field for notifying such information.

SUMMARY OF THE INVENTION

The present invention has been made to address at least the above problems and/or disadvantages and to provide at least the advantages described below. Accordingly, an aspect of the present invention provides a data transmission/reception method and apparatus for supporting various pilot patterns in a mobile communication system using multiple antennas.

Another aspect of the present invention provides a method and apparatus capable of efficiently managing control channels in a mobile communication system using multiple antennas.

According to one aspect of the present invention, a method is provided for receiving control information by a terminal. A control channel message is received on a control channel. Control information comprising a transmission rank and precoding matrix information is extracted from the control channel message if a common pilot is used for data demodulation. The control information comprising the transmission rank and information about a dedicated pilot is extracted from the control channel message if the dedicated pilot is used for the data demodulation.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

Figure 1:
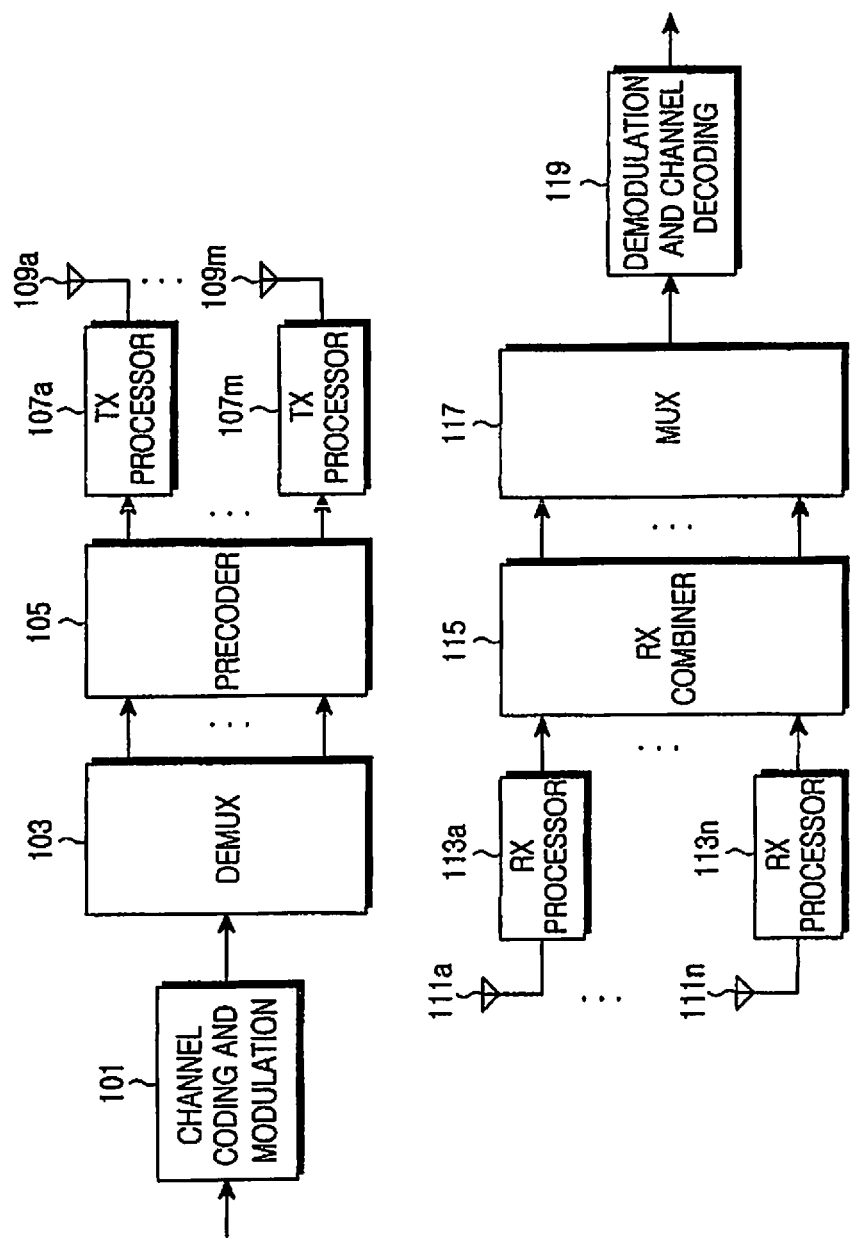
FIG. 1 is a diagram illustrating a structure of an SCW MIMO transceiver, according to an embodiment of the present invention.

Preferred embodiments of the present invention are described in detail with reference to the annexed drawings. In the drawings, the same or similar elements are denoted by the same or similar reference numerals even though they are depicted in different drawings. Detailed descriptions of constructions or processes known in the art may be omitted to avoid obscuring the subject matter of the present invention.

The present invention provides a method and apparatus for transmitting/receiving data using precoding and/or various types of dedicated pilot patterns in a mobile communication system employing multiple antennas. To this end, the present invention adds a field of a shared control channel, for MIMO transmission, to transmit/receive data efficiently.

For a better understanding of the present invention, a description will first be made of the system using multiple antennas.

When MIMO is realized with multiple antennas, a precoding method is used for adaptively forming transmission beams according to the channel state. The term 'precoding' as used herein refers to an operation in which a transmitter pre-distorts transmission signals before the stage of transmitting signals over transmit antennas. If the precoding is realized with linear combining, the precoding process can be expressed as Equation (1).

$$x=Es \quad (1)$$

In Equation (1), 's' is a K×1 vector, and denotes a desired transmission signal, and 'x' is an M×1 vector, and denotes an actually transmitted signal. However, K denotes the number of symbols simultaneously transmitted by MIMO over the same resources, and M denotes the number of transmit antennas. Further, E is an N×K matrix, and denotes precoding. That is, Equation (1) indicates that a MIMO transmitter with M transmit antennas applies a precoding scheme, called E, when it simultaneously transmits K signal streams.

A precoding matrix E is adaptively determined according to a transmission MIMO channel. However, when the transmitter cannot acquire information on the transmission MIMO channel, it performs precoding according to feedback information reported by the receiver. To this end, a precoding codebook including a finite number of precoding matrixes E is preset between the transmitter and the receiver. The receiver selects the precoding matrix E most preferred in the current channel state from this precoding codebook, and feeds it back to the transmitter. Then the transmitter performs MIMO transmission using the precoding matrix.

The transmission signal of Equation (1), received over a MIMO channel H, is expressed as Equation (2).

$$y=Hx+z=HEs+z \quad (2)$$

In Equation (2), y and z each are an N×1 vector, and denote a signal and a noise signal received at N receive antennas, respectively, and H is an N×M matrix, and denotes a MIMO channel. The received signal undergoes reception combining process so that a Signal-to-Interference and Noise Ratio (SINR) of a transmission signal stream of each layer may be improved. The signal r that underwent the reception combining process is defined as Equation (3).

$$r=Wy=WHx+Wz=WHEs+Wz \quad (3)$$

In Equation (3), W is an N×N matrix, and denotes the reception combining process, and r is an N×1 signal vector. To correctly receive a transmission signal stream of each layer, it is possible to additionally use a reception technique such as interference cancellation and/or Maximum Likelihood (ML) reception.

The MIMO technique can be classified into a Single CodeWord (SCW) scheme and a Multi-CodeWord (MCW) scheme according to the number of coded packets from which multiple signal streams transmitted by MIMO technique are generated.

FIG. 1 illustrates a structure of an SCW MIMO transceiver, according to an embodiment of the present invention. Referring to FIG. 1, a desired transmission data stream is converted into one coded packet signal stream after undergoing a channel coding and modulation process at block 101. For MIMO transmission, this signal stream is demultiplexed into K signal streams at demultiplexer 103. The demultiplexed K signal streams are linear-converted into M signal streams to be transmitted via associated transmit antennas, after undergoing precoding at precoder 105. This can be considered a process of transmitting K signal streams over different transmission beams. The precoded M signal streams are transmitted via transmit antennas 109a-109m by way of associated transmission processors 107a-107m, respectively. The transmission processors 107a-107m each not only generate a CDMA or OFDMA signal, but also filter or Radio Frequency (RF) process at each antenna. The transmitted signals are received at N receive antennas 111a-111n, and the signals received at the receive antennas are restored to baseband signals by means of associated reception processors 113a-113n. The reception-processed signals undergo reception combining at a reception combiner 115, and are then restored to the original desired transmission signal stream after undergoing multiplexing at multiplexer 117. Finally, the original desired transmission data stream is restored by means of demodulation and channel decoding at block 119.

According to the SCW MIMO characteristic, because the SCW MIMO transmitter generates multiple transmission signal streams by applying one channel coding and modulation process 101, it only needs to receive one CQI feedback. However, the number of MIMO-transmitted transmission signal streams, i.e., the number K of transmitted MIMO layers, should be adjusted according to the channel state. The number K of transmitted MIMO layers is referred to herein as 'Rank'. Therefore, the feedback of SCW MIMO is composed of one CQI representative of the channel state of transmission MIMO layers, and the number 'Rank' of transmission MIMO layers.

Figure 2:
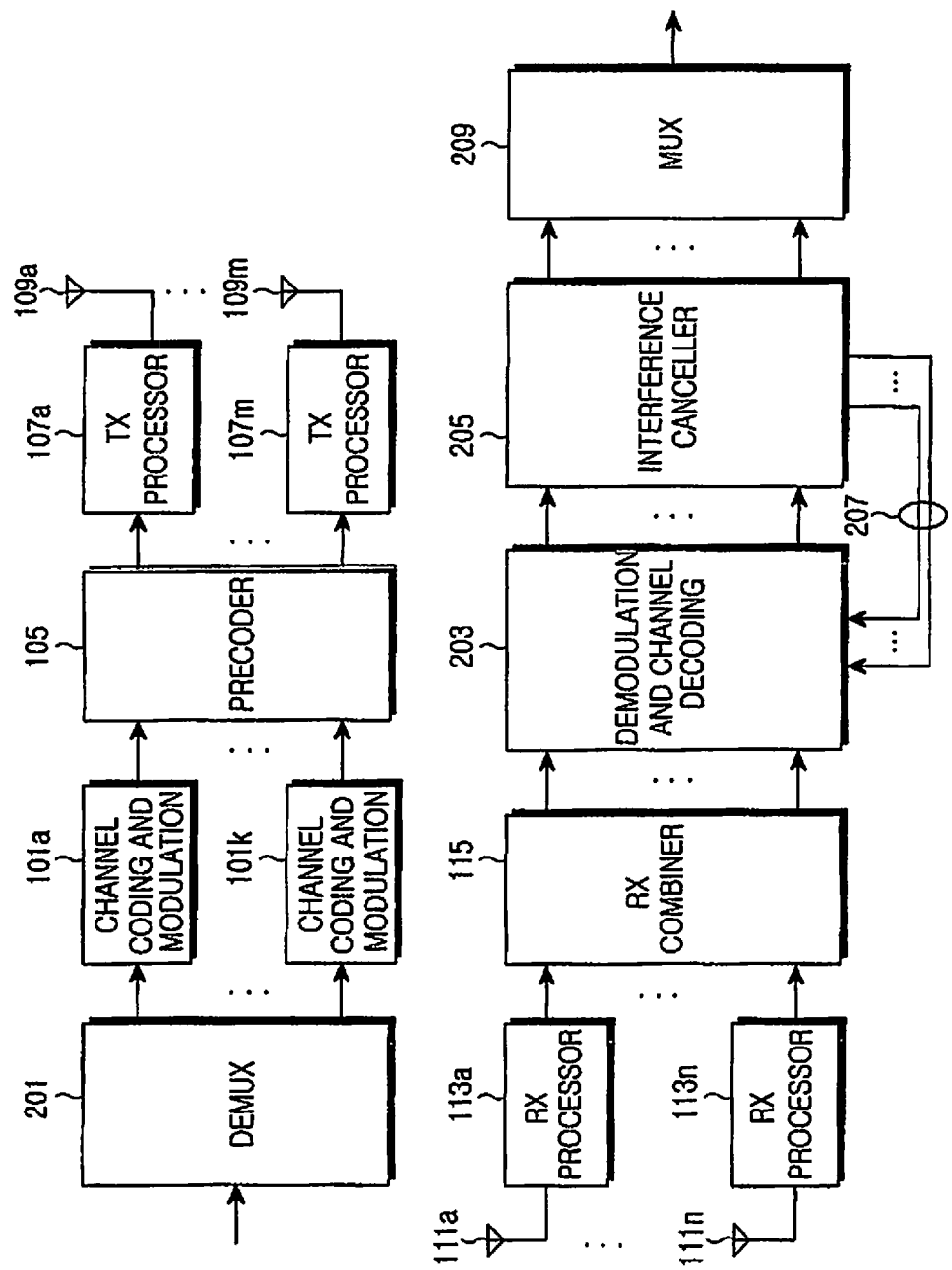
FIG. 2 is a diagram illustrating a structure of an MCW MIMO transceiver, according to an embodiment of the present invention.

FIG. 2 illustrates a structure of an MCW MIMO transceiver, according to an embodiment of the present invention. The MCW MIMO transceiver, unlike the SCW MIMO transceiver, transmits different coded packet signal streams over different MIMO layers. Therefore, a desired transmission data stream is demultiplexed into as many streams as 'Rank' in demultiplexer 201, and the demultiplexed signal streams are converted into signal streams of associated MIMO layers after undergoing different channel coding and modulation processes at blocks 101a-101k, respectively. The following transmission process is equal to that of the SCW MIMO transceiver described above, and the signals to be transmitted via M transmit antennas 109a-109m are generated by means of the precoding process at precoder 105 and the transmission processing processes of transmission processors 107a-107m of their associated transmit antennas. A reception process of the MCW MIMO transceiver is also equal to the reception process of the SCW MIMO transceiver in several steps immediately after the signal reception.

The receiver uses an interference canceller 205 in FIG. 2, by way of example, however, the receiver can use other types of reception methods. The signals received at N receive antennas 111a-111n are restored to the transmission signals of associated layers after passing through reception processors 113a-113n, and a reception combiner 115 in order. The restored signals include mutual interference. In MCW MIMO, because the transmission signals have undergone different channel coding and modulation processes separately for associated layers, the receiver can cancel the first restored signal of a particular layer to remove the interference effect that the corresponding signal renders to other layers. The use of the interference canceller 205 can improve channel capacities of the MIMO layers, so it is possible to transmit a larger amount of data through the MCW MIMO transmission. A reception process based on the interference cancellation will be described below. When a signal of one layer is successfully restored through demodulation and channel decoding at block 203, the receiver cancels interference using the restored signal at interference canceller 205. The interference-canceled signal stream 207 is delivered back to the demodulation and channel decoding process block 203, and the restoration and interference cancellation are repeated until signals of all layers are successfully restored and/or there is no more signal of layer to be restored. Finally, the restored multiple signal streams of associated layers are restored to one original desired transmission data stream by means of multiplexer 209.

According to the MCW MIMO characteristic, because the MCW MIMO transmitter generates multiple transmission signal streams by applying multiple channel coding and modulation processes in blocks 101a-101k separately for associated layers, it should receive CQI feedbacks separately for their associated layers. As to the Rank, it can be expressed in an immanent way by setting a predetermined CQI value indicating 'No Transmission' among CQI values, rather than separately feeding it back. Therefore, the feedback of MCW MIMO is composed of multiple CQIs representative of channel states of associated transmission MIMO layers.

A method for forming and expressing precoding can be classified into a knockdown method and a ready-made method.

The knockdown method establishes multiple universal matrixes, designates one of the universal matrixes, and selects certain column vectors of the designated universal matrix to make a detailed precoding method. For example, when the knockdown method establishes two matrixes U1 and U2 as universal matrixes, and selects column vectors #1 and #3 of the matrix U1 to form two layers for MIMO transmission, the precoding matrix is defined as E=[U1(:,1), U1(:,3)], where A(:,i) denotes an $i^{th}$ column vector of a matrix A. To express the precoding matrix formed by the knockdown method, MCW MIMO uses a universal matrix index indicating which universal matrix is selected. The selection/non-selection of column vectors can be expressed by means of a Packet Format of each layer. The Packet Format is used for indicating a modulation scheme and a channel coding scheme when AMC is realized, and one of Packet Formats is set to 'Null' to indicate no transmission of data. In this manner, even though the information indicating which column vector is selected is not provided by a separate scheme, MCW MIMO can distinguish the activated column vectors from the inactivated column vectors using the Null Packet Format.

In order to express the precoding matrix formed by the knockdown method, SCW MIMO needs not only the universal matrix index but also the vector bitmap indicating which column vector is selected. As to the vector bitmap, a bitmap corresponding to a column length of the universal matrix is established. When an $n^{th}$ bit of the bitmap is set to '1', it indicates that an $n^{th}$ column vector is selected, and when the $n^{th}$ bit is set to '0', it indicates that the $n^{th}$ column vector is not selected.

The ready-made method establishes multiple precoding matrixes and selects one of the precoding matrixes. It is necessary to adjust Rank even with the ready-made method. While the knockdown method adjusts Rank by designating which column vector of the selected universal matrix is selected, the ready-made method adjusts Rank by designating only the Rank value. Once Rank is designated, the ready-made method selects a first column vector through a $(Rank)^{th}$ column vector of the selected precoding matrix. MCW MIMO uses a matrix index for selecting a precoding matrix in order to express the precoding matrix formed by the ready-made method. SCW MIMO uses a matrix index and a Rank value to express the precoding matrix formed by the ready-made method.

One example of the simple precoding methods based on the knockdown method can include binary unitary precoding for Antenna Selection MIMO. For the universal matrix defined by the knockdown method, only one identity matrix I is defined. The identity matrix is a matrix in which all diagonal components are '1' and the remaining components are '0'. The knockdown precoding scheme having only the identity matrix as the universal matrix precodes an $n^{th}$ column vector in the way of carrying a signal on an $n^{th}$ transmit antenna without distortion and carrying no signal on the remaining transmit antennas. That is, in the knockdown method, the vector bitmap indicates which transmit antenna the knockdown method selects. For this reason, the knockdown precoding technique using the binary unitary precoding is called 'Antenna Selection MIMO'.

Antenna Selection Space Time Transmit Diversity (STTD), like the Antenna Selection MIMO, is a technology that selects a transmit antenna and transmits signals only via the selected antenna. However, while Antenna Selection MIMO has no limitation on the number of selected transmit antennas and sends signals of different MIMO layers via the selected transmit antennas separately, Antenna Selection STTD limits the number of selected transmit antennas to 2, and applies STTD for signal transmission using the two selected transmit antennas. STTD is designed to transmit one data stream with the Alamouti coding-based transmit diversity technique. STTD is also called 'orthogonal spatial coding' because it is characterized by arranging transmission complex symbols as shown in Equation (4) so that orthogonality between transmission symbols may be maintained in any space channel.

$$\begin{bmatrix} S_i & -S_{i+1}^* \\ S_{i+1} & S_i^* \end{bmatrix} \quad (4)$$

where $S_i$ denotes an $i^{th}$ symbol of a data stream. In the matrix of Equation (4), rows are antenna dimensions and columns are time dimensions. That is, in a first symbol time, $S_i$ is transmitted at a first transmit antenna, and $S_{i+1}$ is transmitted at a second transmit antenna in a second. In the next symbol time, $-S_{i+1}^*$ is transmitted at the first transmit antenna, and $S_i^*$ is transmitted at the second transmit antenna. In this manner, STTD forms the symbol matrix of Equation (4) in the space and time. Because the OFDM system can transmit different symbols not only in the time but also in the frequency, the columns can be frequency dimensions in the matrix of Equation (4).

Figure 3:
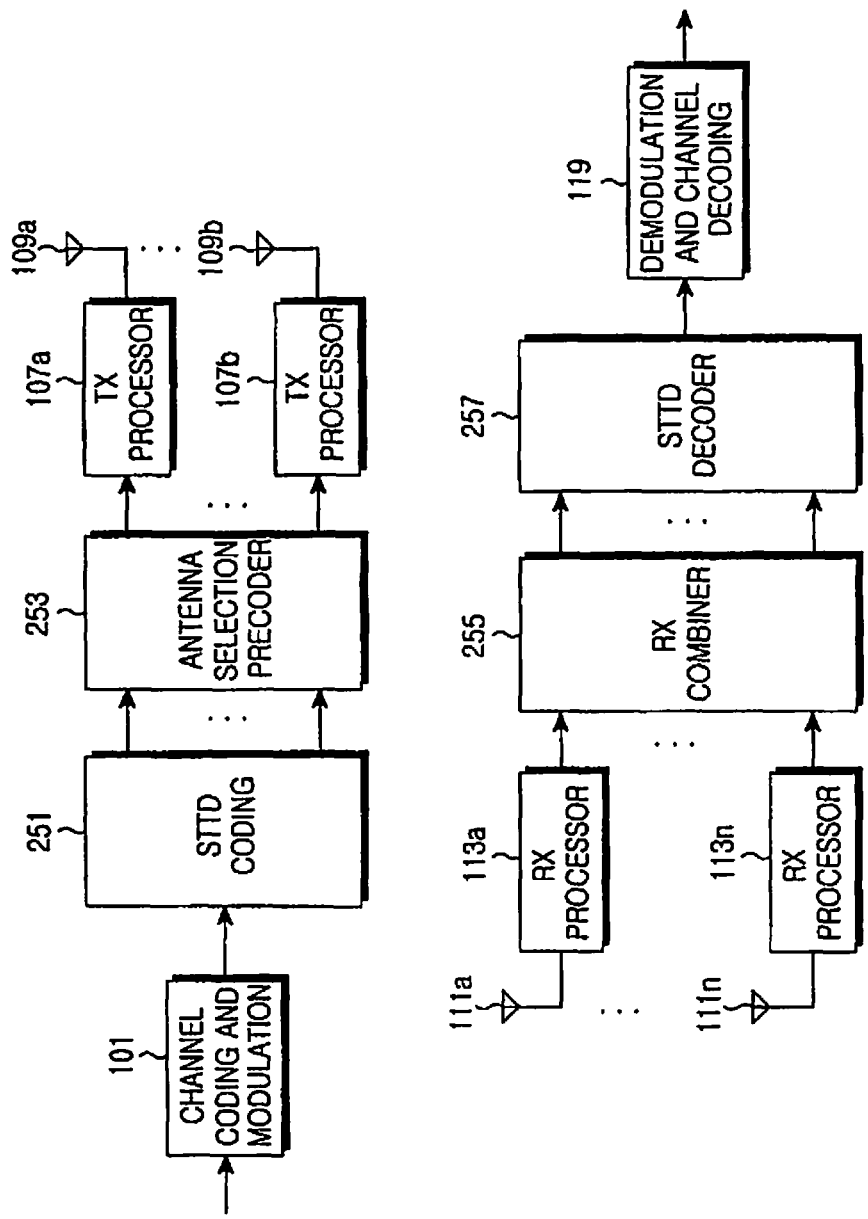
FIG. 3 is a diagram illustrating a structure of an Antenna Selection STTD transceiver, according to an embodiment of the present invention.

FIG. 3 illustrates a structure of a transceiver employing Antenna Selection STTD, according to an embodiment of the present invention. A desired transmission data stream is converted into one coded packet signal stream after undergoing a channel coding and modulation process in block 101. This signal stream is converted into the form of signal streams to be transmitted via two transmit antennas after undergoing STTD coding in block 251. The transceiver performs Antenna Selection precoding in block 253 to realize Antenna Selection STTD. Herein, however, the number of selected antennas is 2. That is, the two spatial signal streams generated by STTD coding in block 251 are transferred to the selected two transmit antennas 109a and 109b via transmission processors 107a and 107b, respectively.

The signals received at multiple receive antennas 111a-111n are combined into one signal stream by a reception combiner 255 after passing through reception processors 113a-113n. This one signal stream is a signal obtained by linearly combining the STTD signal streams transmitted from two transmit antennas. An STTD decoder 257 separates the signal streams combined in one signal stream using orthogonality therebetween. The separated signal streams are restored to the transmission data stream by way of a demodulation and channel decoder 119.

In the OFDMA system, a base station transmits pilots for synchronous demodulation (or coherent detection) of forward transmission data and for quality measurement of forward channels. The pilots used for data demodulation are classified into common pilots and dedicated pilots according to their form.

The common pilot, a pilot transmitted by the base station, is commonly used by several users (or terminals), and the common pilot can be used for both the data demodulation and the channel quality measurement. The common pilot is characterized in that it always has the constant period regardless of data transmission and resource assignment, and is transmitted over the entire available band of the system.

The dedicated pilot, a pilot transmitted to a particular user, is used by one user, i.e., by only the user that receives data over a particular resource at a particular time. For the dedicated pilot, it is efficient to use the most preferred pattern according to the channel state for the user occupying particular resources, and/or the Rank value for MIMO transmission. For example, for a user in the frequency-selective fading environment where the change in channel response is considerable in the frequency domain, it is efficient to use the pilot pattern designed such that more pilots are inserted in the frequency domain; and for a user in the fast fading environment where the change in channel response is considerable in the time domain, it is efficient to use the pilot pattern designed such that more pilots are inserted in the time domain. For the user with a Rank that will most likely be set as high, due to a low correlation between space channels and a larger number of receive antennas, it is preferable to use the pilot pattern in which it is possible to insert many orthogonal pilots used for distinguishing layers. On the contrary, however, for the user with a Rank that will most likely be set as low, it is preferable to use the pilot pattern in which it is possible to reduce the amount of resources to be assigned to the pilot because there is no need to insert many orthogonal pilots. Therefore, for the dedicated pilot, the invention prepares multiple patterns and selects the most appropriate pattern among them according to the channel state of the user.

The OFDMA system can be classified into: (i) a system that supports only the common pilot as a pilot for forward data demodulation; (ii) a system that supports only the dedicated pilot; and (iii) a system that supports both the common pilot and the dedicated pilot. Although the present invention will be described herein with reference to the system supporting both the common pilot and the dedicated pilot, the present invention can be used even for the system supporting only one of the common pilot and the dedicated pilot.

In the case where the base station uses the common pilot, when the base station, in a process of transmitting forward data, intends to form one or multiple beams by applying predetermined precoding for multiple antennas to transmit data over the beams, it is common that the base station cannot apply precoding suitable for the particular user, to the common pilot. This is due to the fact that the common pilot is commonly used for several users. Therefore, in the case where the base station uses the common pilot and forms beam(s) by applying precoding for data transmission to transmit data over the beams, the receiver, or terminal, for receiving the data should previously acquire information indicating which precoding has been applied to the data transmission. This allows the receiver to perform channel estimation on the received common pilot taking into account the precoding applied to the data transmission, and thus enabling data demodulation.

However, in the case where the base station uses the dedicated pilot, when the base station, in a process of transmitting forward data, intends to form one or multiple beams by applying predetermined precoding for multiple antennas to transmit data over the beams, it is common that the base station applies the same precoding used for the data transmission to the dedicated pilot before transmission. This is possible because the dedicated pilot is a pilot only for one particular user. The foregoing characteristic makes the receiver have no need for the information indicating which precoding the transmitter has applied, in a process of receiving and demodulating the data to which precoding is applied. That is, because the same precoding was applied to the data and the pilot, the data receiver only needs to perform channel estimation using the pilot, and as the channel estimation already includes the precoding, the receiver only needs to use the intact channel estimated value for the data demodulation.

Using Table 2, a description will be made herein of fields of the shared control channel for MIMO transmission, which uses the foregoing precoding and/or various types of dedicated pilot patterns.

Table 2 shows an message format of a shared control channel proposed by the present invention. The present invention proposes to add a so-called Pilot/MIMO field. In the example of Table 2, an 8-bit Pilot/MIMO field is added. The 8 bits can be analyzed in different ways according to the use/nonuse of the common pilot, the use/nonuse of the knockdown precoding, and the use/nonuse of MCW MIMO. The numbers of bits, stated herein, are all given for convenience of description, and are subject to change in actual realization.

TABLE 2

| | Block type | MACID | Persistent | ChanID # bits | PF | Ext. TX | Rank | Pilot/MIMO |
|---|---|---|---|---|---|---|---|---|
| | 2 | 9-11 | 1 | 6-8 | 4-6 | 1 | 2 | 8 |
| FLAM | 00 | 1 | 1 | 1 | 1 | 1 | 0 | 0 |
| MCW FLAM1 | 01 | 1 | 1 | 1 | 1 | 1 | 0 | 1 |
| MCW FLAM2 | 10 | 1 | 0 | 0 | 3 | 1 | 0 | 1 |
| SCW FLAM | 11 | 1 | 1 | 1 | 1 | 1 | 1 | 1 |

When the common pilot is used, the pilot is not subject to precoding while the data signals are subject to precoding. Therefore, for estimation of an equivalent channel that has undergone precoding, it is necessary to notify which precoding was used. Therefore, when the common pilot is used, the Pilot/MIMO field is used as information for notifying which precoding was used.

When the common pilot is used together with the knockdown precoding, the Pilot/MIMO field is used as information for describing the knockdown precoding scheme. In an MCW MIMO mode, only 1 bit among the 8 bits is used as a universal matrix index, and the remaining 7 bits are all set as a reversed value. In an SCW MIMO mode, 1 bit among the 8 bits is used as a universal matrix index, 4 bits are used as a vector bitmap, and the remaining 3 bits are set as a reversed value. When there is only one universal matrix, the 1 bit, which is set as the universal matrix index, is also set as the reversed value. The Antenna Selection MIMO technique is the typical knockdown precoding scheme that has only one universal matrix.

When the common pilot is used together with the ready-made precoding, the Pilot/MIMO field is used as information for describing the ready-made precoding scheme. In the MCW MIMO mode, 6 bits among the 8 bits are used as a precoding matrix index, and the remaining 2 bits are all set as a reversed value. In the SCW MIMO mode, 6 bits among the 8 bits are used as a precoding matrix index, and the remaining 2 bits are used as Rank information.

Because the dedicated pilot undergoes the same precoding as that for the data, there is no need for the information for separately describing the precoding scheme. Therefore, the Pilot/MIMO field is used as information for describing the pilot pattern and, when necessary, Rank. When the dedicated pilot is used in the MCW MIMO mode, 2 bits among the 8 bits are used as information for describing the pilot pattern, and the remaining 6 bits are set as a reversed value. When the dedicated pilot is used in the SCW MIMO mode, 2 bits among the 8 bits are used as information for describing the pilot pattern, 2 additional bits are used as Rank information, and the remaining 4 bits are set as a reversed value.

Antenna Selection STTD can be supported only in the SCW MIMO mode, and can be supported only when Antenna Selection precoding, i.e., binary unitary precoding, among the knockdown precoding schemes is used.

When the common pilot is used together with the knockdown precoding, 1 bit among the 8 bits of the Pilot/MIMO field is set as a universal matrix index. However, when Antenna Selection MIMO is applied, it is provided that the 1 bit is set as a reversed value because it is meaningless. When it is intended to support Antenna Selection STTD, the 1-bit universal matrix index, which is actually unused, is used for indicating whether the transmission is performed by Antenna Selection STTD. That is, the universal matrix index=1 indicates Antenna Selection STTD transmission, and the universal matrix index=0 indicates Antenna Selection MIMO transmission. In addition, the 4-bit vector bitmap is used for indicating selected antennas. Herein, when the number of selected antennas is not 2, an error occurs. This is because STTD can be applied only to two transmit antennas. The remaining 4 bits are set as a reversed value.

When the dedicated pilot is used in the SCW MIMO mode, it is provided that 2 bits among the 8 bits are used as information for describing the pilot pattern, and 2 bits are used as Rank information. In the Antenna Selection STTD technique, the Rank information is meaningless, because it is always that two transmit antennas should be selected and Rank is 1. Therefore, the 2 bits expected to be used as Rank information are set as a reversed value. Of the remaining 4 bits, 1 bit is used as information for indicating whether the transmission is performed by Antenna Selection STTD. In the Antenna Selection STTD and Antenna Selection MIMO operations, the dedicated pilot is a pilot of an associated antenna, selected so as to estimate a channel of the selected antenna. Therefore, the receiver does not need the process of determining which antenna is selected.

With reference to the accompanying drawings, a description will now be made of a method for writing (or recording) information messages in a shared control channel according to the present invention.

Figure 4:
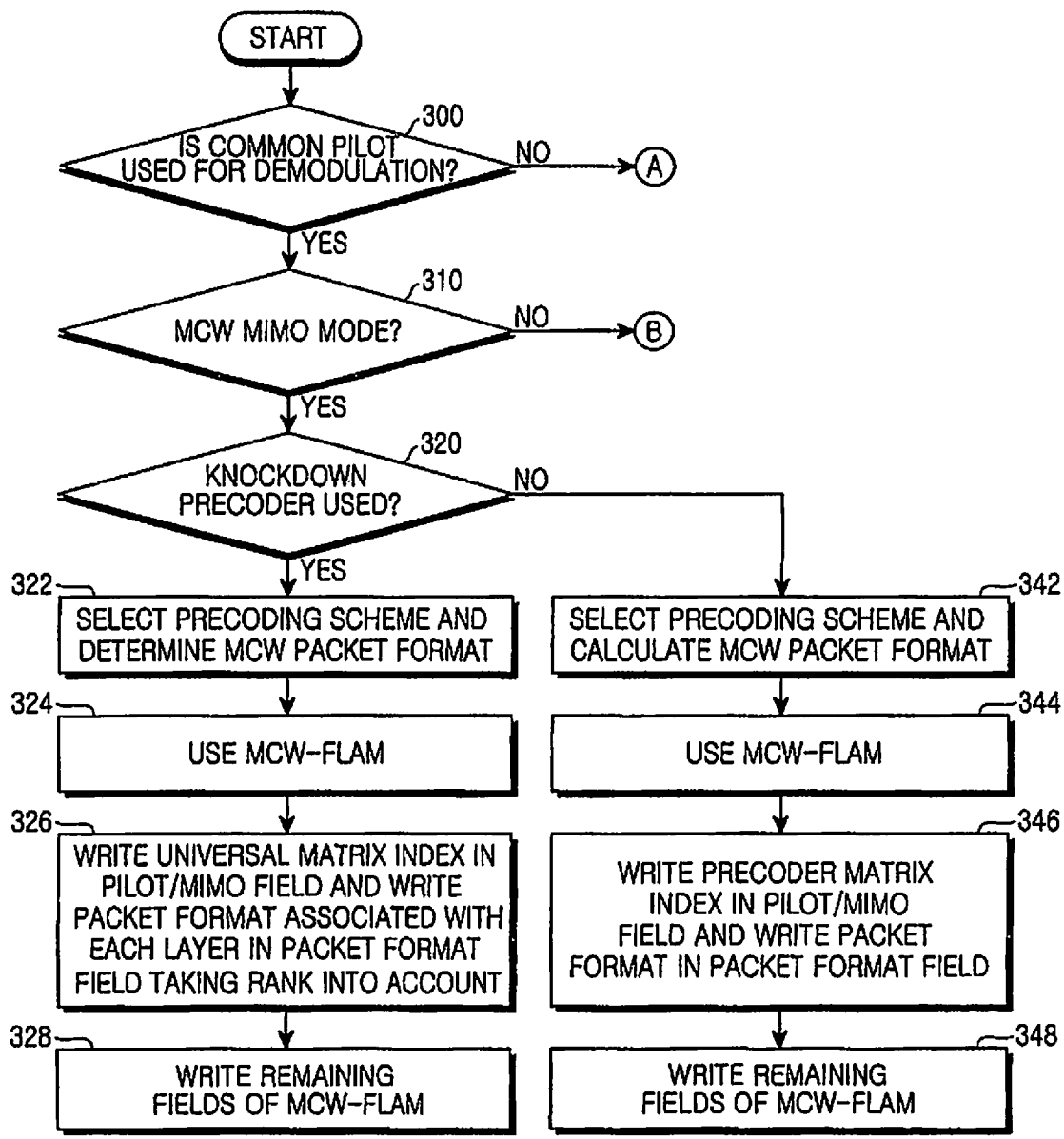
FIGS. 4 to 6 are flowcharts illustrating a shared control channel information writing methodology, according to an embodiment of the present invention.
Figure 5:
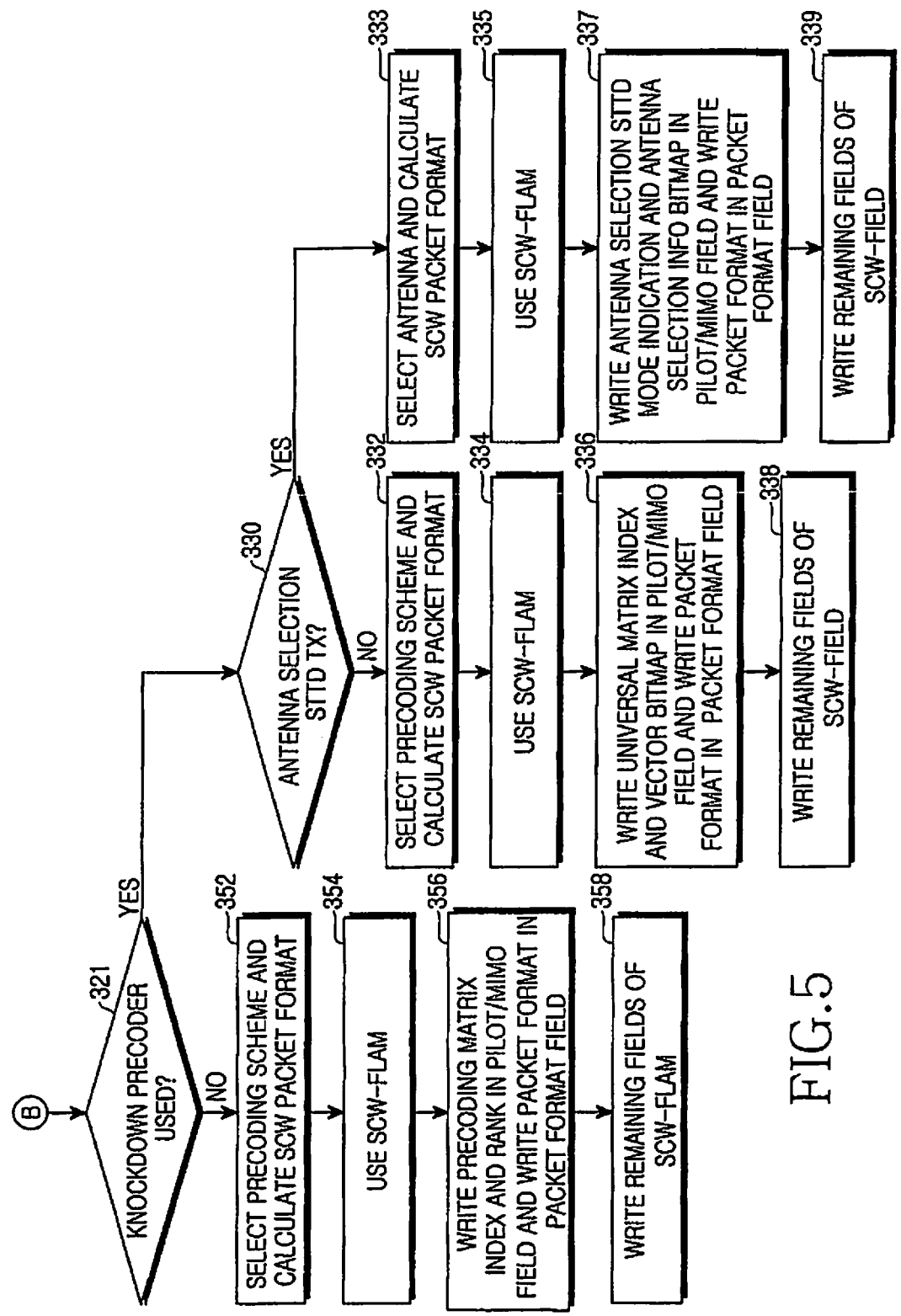
Figure 6:
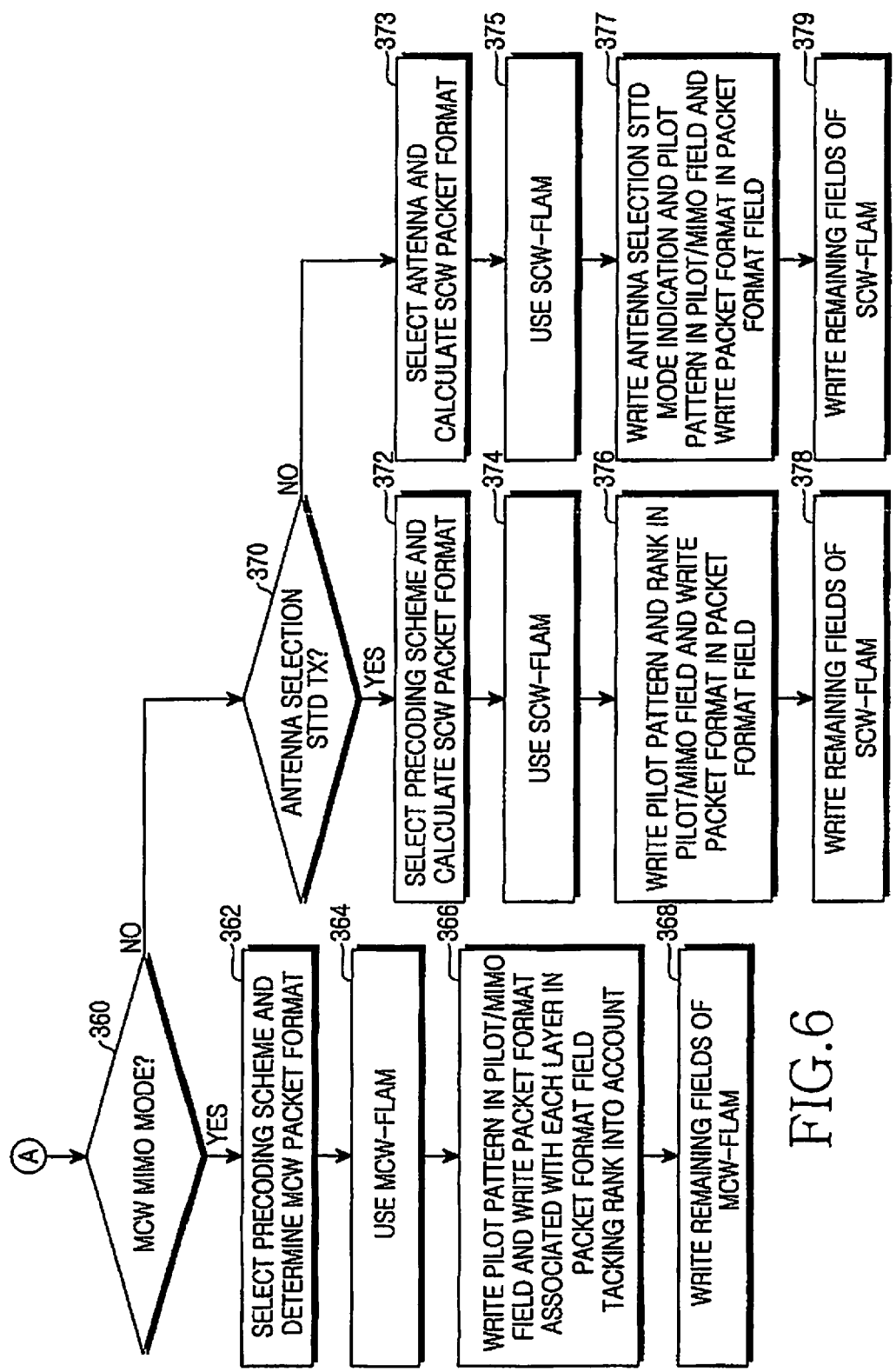

FIGS. 4 to 6 illustrate flowcharts in which a base station writes shared control channel information, according to an embodiment of the present invention. Referring to FIGS. 4 to 6, the base station determines in step 300 whether a common pilot is used or a dedicated pilot is used. If the common pilot is used, the base station proceeds to step 310, and if the dedicated pilot is used, the base station proceeds to step 360 shown in FIG. 6.

If it is determined in step 300 that the common pilot is used, the base station determines in step 310 whether it is in an MCW MIMO mode or an SCW MIMO mode. If it is in the MCW MIMO mode, the base station determines in step 320 whether it uses knockdown precoding. However, if it is in the SCW MIMO mode, the base station determines in step 321 shown in FIG. 5 whether it uses knockdown precoding.

The base station operates as follows according to the use/nonuse of the common pilot in step 300, the selection of MCW MIMO or SCW MIMO mode in step 310, the use/nonuse of knockdown precoding in step 320, and the use/nonuse of knockdown precoding in step 321 in FIG. 5.

When the base station uses the common pilot and the knockdown precoding in the MCW MIMO mode, the base station proceeds to step 322. When the base station uses the common pilot and the ready-made precoding in the MCW MIMO mode, the base station proceeds to step 342. When the base station uses the common pilot and the knockdown precoding in the SCW MIMO mode, the base station proceeds to step 330 in FIG. 5. When the base station uses the common pilot and the ready-made precoding in the SCW MIMO mode, the base station proceeds to step 352 in FIG. 5.

When the base station uses the common pilot in the MCW MIMO mode where it uses the knockdown precoding, the base station selects a particular knockdown precoding scheme and determines PFs of MCW MIMO in step 322. In step 324, the base station uses an MCW FLAM. In step 326, the base station writes a universal matrix index in a Pilot/MIMO field, and writes a PF associated with each layer in a PF field taking Rank into account. In step 328, the base station writes the remaining MCW-FLAM fields.

When the base station uses the common pilot in the MCW MIMO mode where it uses the ready-made precoding, the base station selects a particular ready-made precoding scheme and determines PFs of MCW MIMO in step 342. In step 344, the base station uses an MCW FLAM. In step 346, the base station writes a precoding matrix index in a Pilot/MIMO field, and writes a PF associated with each layer in a PF field taking Rank into account. In step 348, the base station writes the remaining MCW-FLAM fields.

When the base station uses the common pilot in the SCW MIMO mode where it uses the ready-made precoding, the base station selects a particular ready-made precoding scheme and determines a PF of SCW MIMO in step 352. In step 354, the base station uses an SCW FLAM. In step 356, the base station writes a precoding matrix index and Rank in a Pilot/MIMO field, and writes the PF in a PF field. In step 358, the base station writes the remaining SCW-FLAM fields.

When the base station uses the common pilot in the SCW MIMO mode where it uses the knockdown precoding, the base station can use Antenna Selection STTD transmission only when the Antenna Selection precoding, i.e., binary unitary precoding, is used as the knockdown precoding. Therefore, the base station determines in step 330 whether the corresponding transmission is Antenna Selection STTD transmission. If the normal knockdown precoding is used for the transmission, the base station proceeds to step 332, and if the corresponding transmission is Antenna Selection STTD transmission, the base station proceeds to step 333.

When the base station uses the common pilot in the SCW MIMO mode where it uses the normal knockdown precoding, the base station selects a particular knockdown precoding scheme and determines a PF of SCW MIMO in step 332. In step 334, the base station uses an SCW FLAM. In step 336, the base station writes a universal matrix index and a vector bitmap in a Pilot/MIMO field, and writes the PF in a PF field. For Antenna Selection MIMO, the base station sets the universal matrix index to '0' in this step to distinguish Antenna Selection MIMO from Antenna Selection STTD. In step 338, the base station writes the remaining SCW-FLAM fields.

In the Antenna Selection STTD mode where the base station uses the common pilot, the base station selects two transmit antennas and calculates a PF to be applied, in step 333. In step 335, the base station uses an SCW FLAM. In step 337, the base station sets in a Pilot/MIMO field a universal matrix index to '1' to notify the Antenna Selection STTD mode and writes antenna selection information in a vector bitmap, and writes the PF in a PF field. In step 339, the base station writes the remaining SCW-FLAM fields.

However, if it is determined in step 300 of FIG. 4 that the dedicated pilot is used, the base station determines in step 360 of FIG. 6 whether the corresponding MIMO mode is an MCW MIMO mode or an SCW MIMO mode.

In the MCW MIMO mode where the base station uses the dedicated pilot, the base station selects a particular ready-made or knockdown precoding scheme, and determines PFs of MCW MIMO in step 362. In step 364, the base station uses an MCW FLAM. In step 366, the base station writes a pilot pattern in a Pilot/MIMO field and writes a PF associated with each layer in a PF field taking Rank into account. In step 368, the base station writes the remaining MCW-FLAM fields.

In the SCW MIMO mode where the base station uses the dedicated pilot, Antenna Selection STTD transmission is available only when Antenna Selection precoding among the knockdown precoding schemes is used. If it is determined in step 370 that the corresponding transmission mode is a normal SCW MIMO mode, the base station proceeds to step 372, and if the corresponding transmission mode is an Antenna Selection STTD mode, the base station proceeds to step 373.

In the normal SCW MIMO mode where the base station uses the dedicated pilot, the base station selects a particular ready-made or knockdown precoding scheme and determines a PF of SCW MIMO in step 372. In step 374, the base station uses an SCW FLAM. In step 376, the base station writes a pilot pattern and Rank in a Pilot/MIMO field, and writes the PF in a PF field taking Rank into account. In step 378, the base station writes the remaining SCW-FLAM fields.

Even in the Antenna Selection MIMO mode where the base station uses the dedicated pilot, the base station performs steps 372 to 378. However, in step 376, the base station fills the bit indicating the Antenna Selection STTD mode in the Pilot/MIMO field with '0' to clarify the Antenna Selection MIMO transmission.

In the Antenna Selection STTD mode where the base station uses the dedicated pilot, the base station selects two transmit antennas and calculates a PF in step 373. In step 375, the base station uses an SCW FLAM. In step 377, the base station sets, in a Pilot/MIMO field, an Antenna Selection STTD mode indication bit to '1' to clarify the Antenna Selection STTD mode, writes a pilot pattern, and writes the PF in a PF field taking Rank into account. In step 379, the base station writes the remaining SCW-FLAM fields.

FIGS. 7 to 10 illustrate flowcharts in which a terminal analyzes shared control channel information, according to an embodiment of the present invention. Referring to FIGS. 7 to 10, the terminal determines in step 400 whether the common pilot is used or the dedicated pilot is used. If the common pilot is used, the terminal proceeds to step 410, and if the dedicated pilot is used, the terminal proceeds to step 411 shown in FIG. 10.

When the common pilot is used, the terminal determines in step 410 whether the corresponding MIMO mode is an MCW MIMO mode or an SCW MIMO mode. When the common pilot is used in the MCW MIMO mode, the terminal starts MCW FLAM analysis from step 412, and when the common pilot is used in the SCW MIMO mode, the terminal starts SCW FLAM analysis from step 414 shown in FIG. 8.

When the common pilot is used in the MCW MIMO mode, the terminal determines in step 420 whether it uses knockdown precoding or ready-made precoding. When the terminal uses the common pilot in the MCW MIMO mode where it uses the knockdown precoding, the terminal acquires a universal matrix index from a Pilot/MIMO field and acquires Rank and PF information associated with each layer from a PF field in step 422. When the terminal uses the common pilot in the MCW MIMO mode where it uses the ready-made precoding, the terminal acquires a precoding matrix index from a Pilot/MIMO field and acquires Rank and PF information associated with each layer from a PF field in step 424. Thereafter, in step 426, the terminal analyzes the remaining fields of the MCW FLAM. In step 428, the terminal determines both the precoding scheme and the MCW MIMO PF, and performs an MCW MIMO reception process based thereon.

When the common pilot is used in the SCW MIMO mode, the terminal determines in step 430 whether it uses knockdown precoding or ready-made precoding. If the terminal uses the knockdown precoding, the terminal further determines in step 440 whether it selects an Antenna Selection precoder.

When the terminal uses the common pilot in the SCW MIMO mode where it uses the ready-made precoding, the terminal acquires precoding matrix index and Rank information from a Pilot/MIMO field, and acquires PF information from a PF field in step 432. When the terminal uses the common pilot in the SCW MIMO mode where it uses the knockdown precoding other than the Antenna Selection precoding, the terminal acquires universal matrix index and vector bitmap information from a Pilot/MIMO field and acquires PF information from a PF field in step 442. Thereafter, in step 436, the terminal analyzes the remaining fields of the SCW FLAM. In step 438, the terminal determines both the precoding scheme and the SCW MIMO PF and performs a SCW MIMO reception process based thereon.

Figure 9:
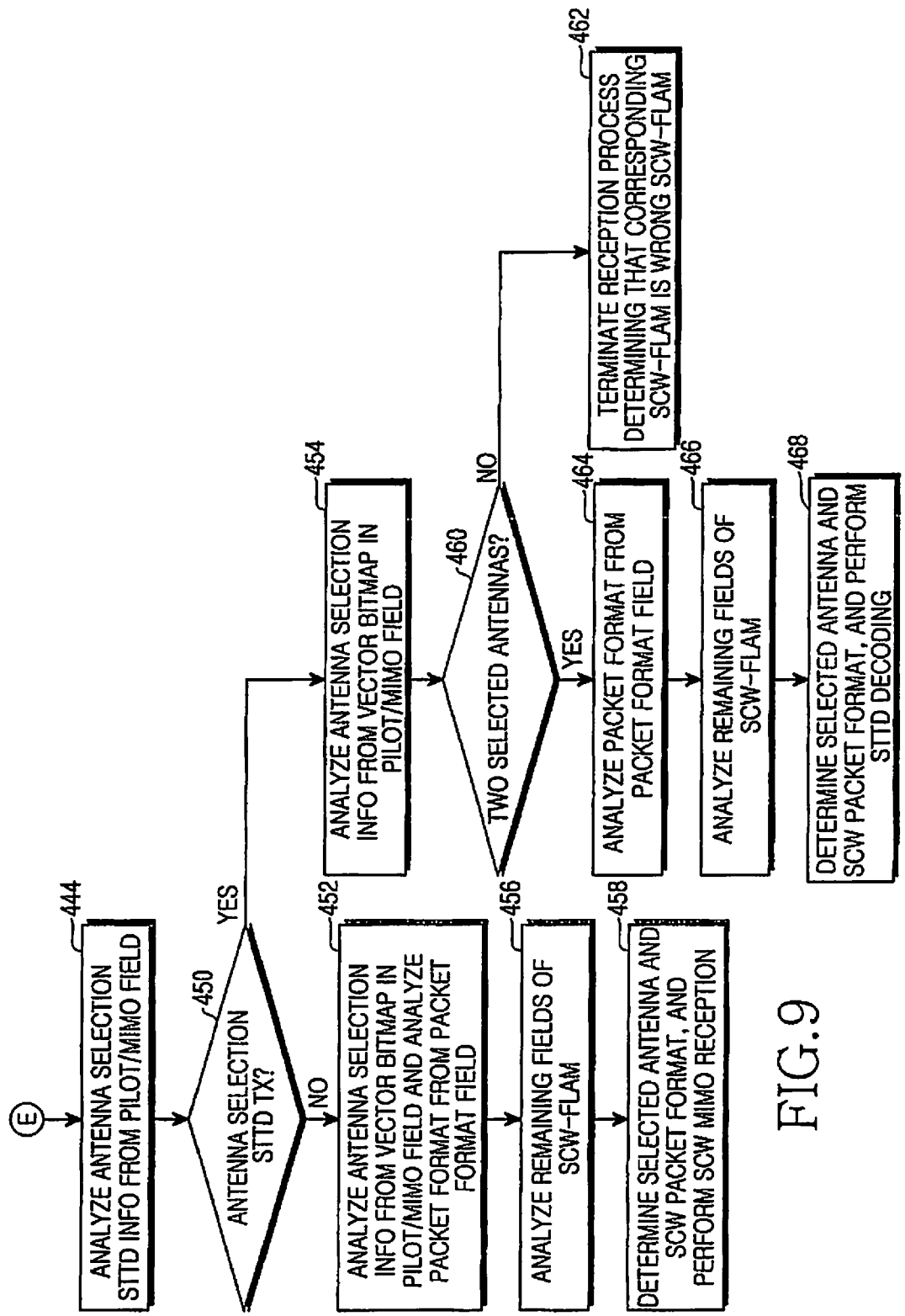

When terminal uses the common pilot in the SCW MIMO mode where it uses the Antenna Selection precoding, the terminal acquires Antenna Selection STTD mode information from a universal matrix index in a Pilot/MIMO field in step 444 shown in FIG. 9. In step 450, the terminal determines based on the information acquired in step 444 whether the corresponding transmission is Antenna Selection STTD transmission or Antenna Selection MIMO transmission. The universal matrix index=0 indicates Antenna Selection MIMO transmission and the universal matrix index=1 indicates Antenna Selection STTD transmission. If it is determined that the corresponding transmission is Antenna Selection SCW MIMO transmission where the common pilot is used, the terminal proceeds to step 452. However, if it is determined that the corresponding transmission is Antenna Selection STTD transmission where the common pilot is used, the terminal proceeds to step 454.

When the terminal uses the common pilot for Antenna Selection SCW MIMO transmission, the terminal analyzes antenna selection information from a vector bitmap in a Pilot/MIMO field and acquires PF information from a PF field in step 452. In step 456, the terminal acquires information of the remaining fields in the SCW FLAM. In step 458, the terminal determines the selected antennas and PF, and performs SCW MIMO reception based thereon.

When the terminal uses the common pilot for Antenna Selection STTD transmission, the terminal acquires antenna selection information from a vector bitmap of a Pilot/MIMO field in step 454. Based on the vector bitmap, the terminal can determine via which transmit antenna the actual transmission has been achieved. In step 460, the terminal determines whether the number of selected antennas is 2. Because Antenna Selection STTD selects two antennas for signal transmission, if the number of selected transmit antennas is not 2, an operation error occurs. Therefore, if the number of selected antennas is not 2, the terminal ends the reception process in step 462, determining that the corresponding SCW FLAM is a wrong SCW FLAM. However, if the number of selected antennas is 2, which is the information indicating the normal Antenna Selection STTD operation, the terminal acquires PF information from a PF field in step 464. In step 466, the terminal acquires information of the remaining fields in the SCW FLAM. In step 468, the terminal performs STTD decoding based on the antenna selection information acquired in step 454 and the PF information acquired in step 464.

Figure 7:
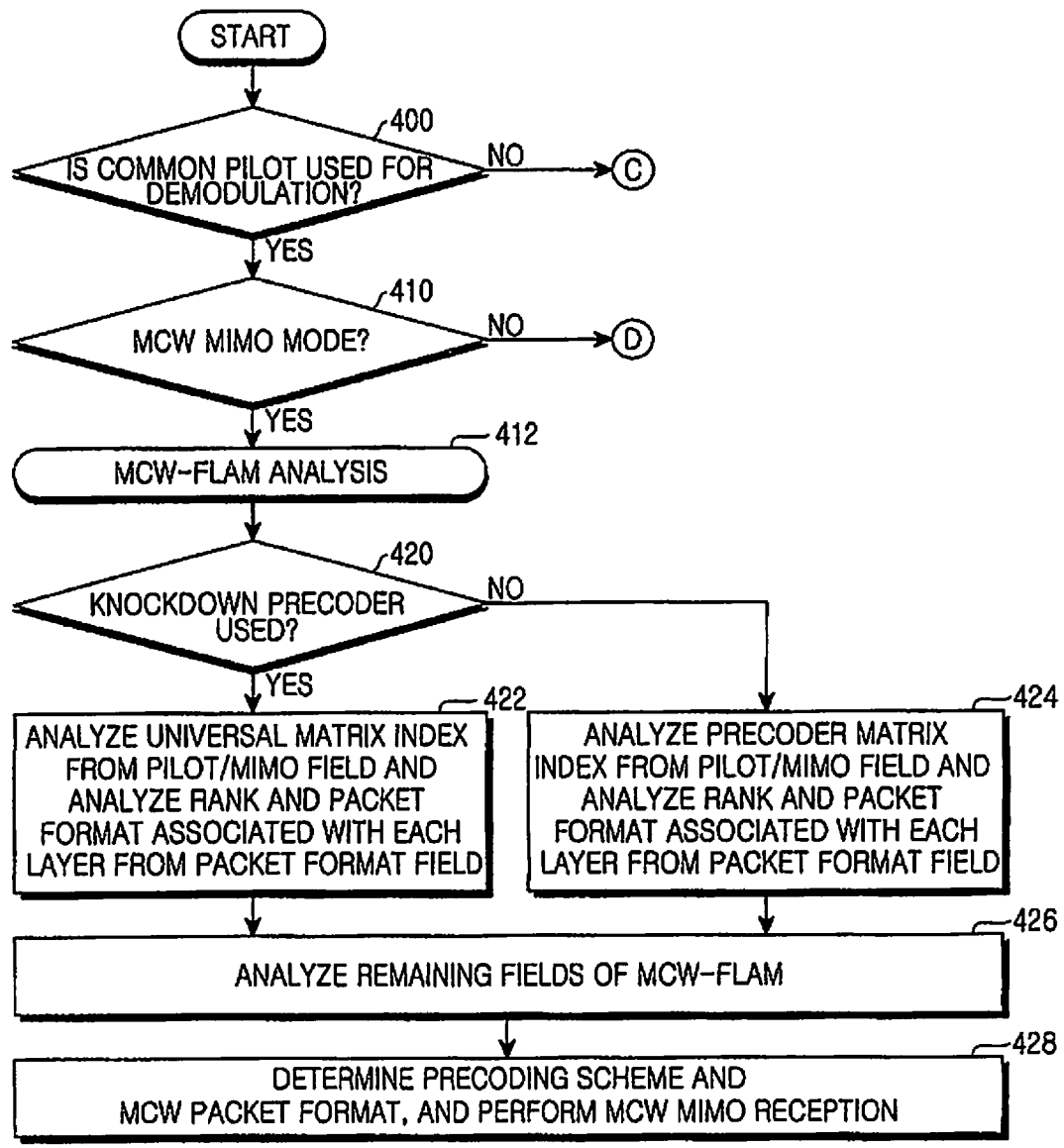
FIGS. 7 to 10 are flowcharts illustrating a shared control channel information analysis methodology, according to an embodiment of the present invention.
Figure 8:
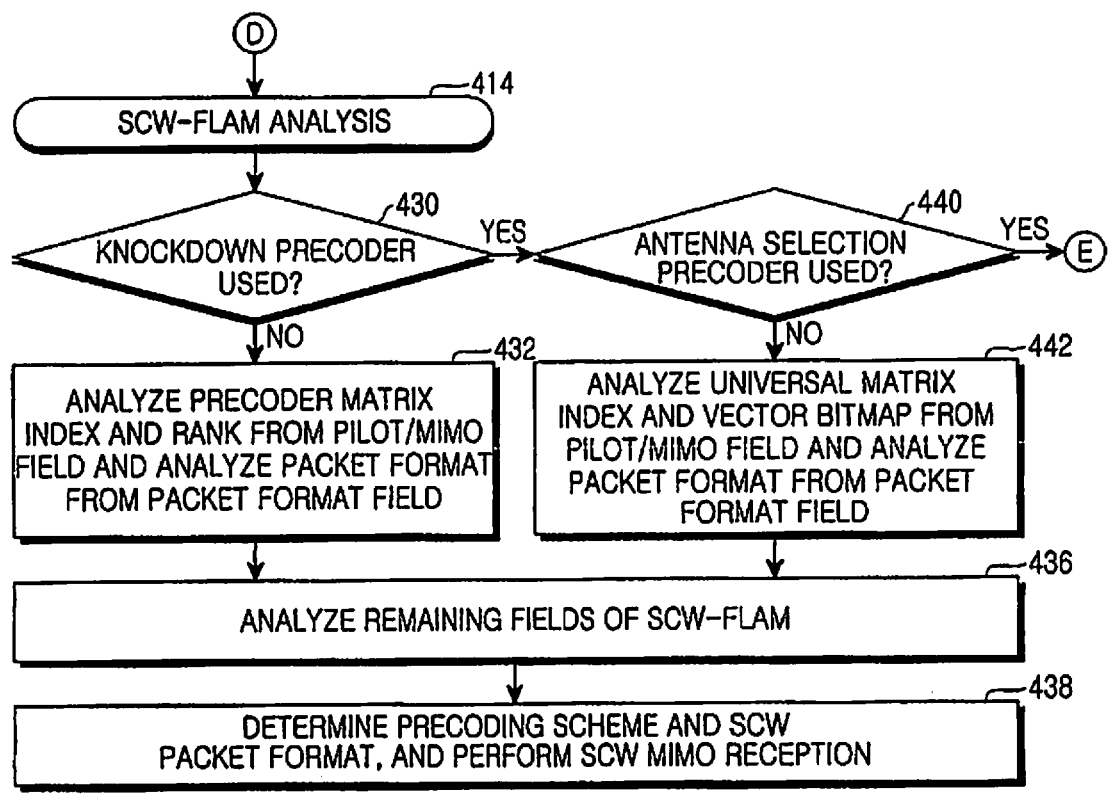
Figure 10:
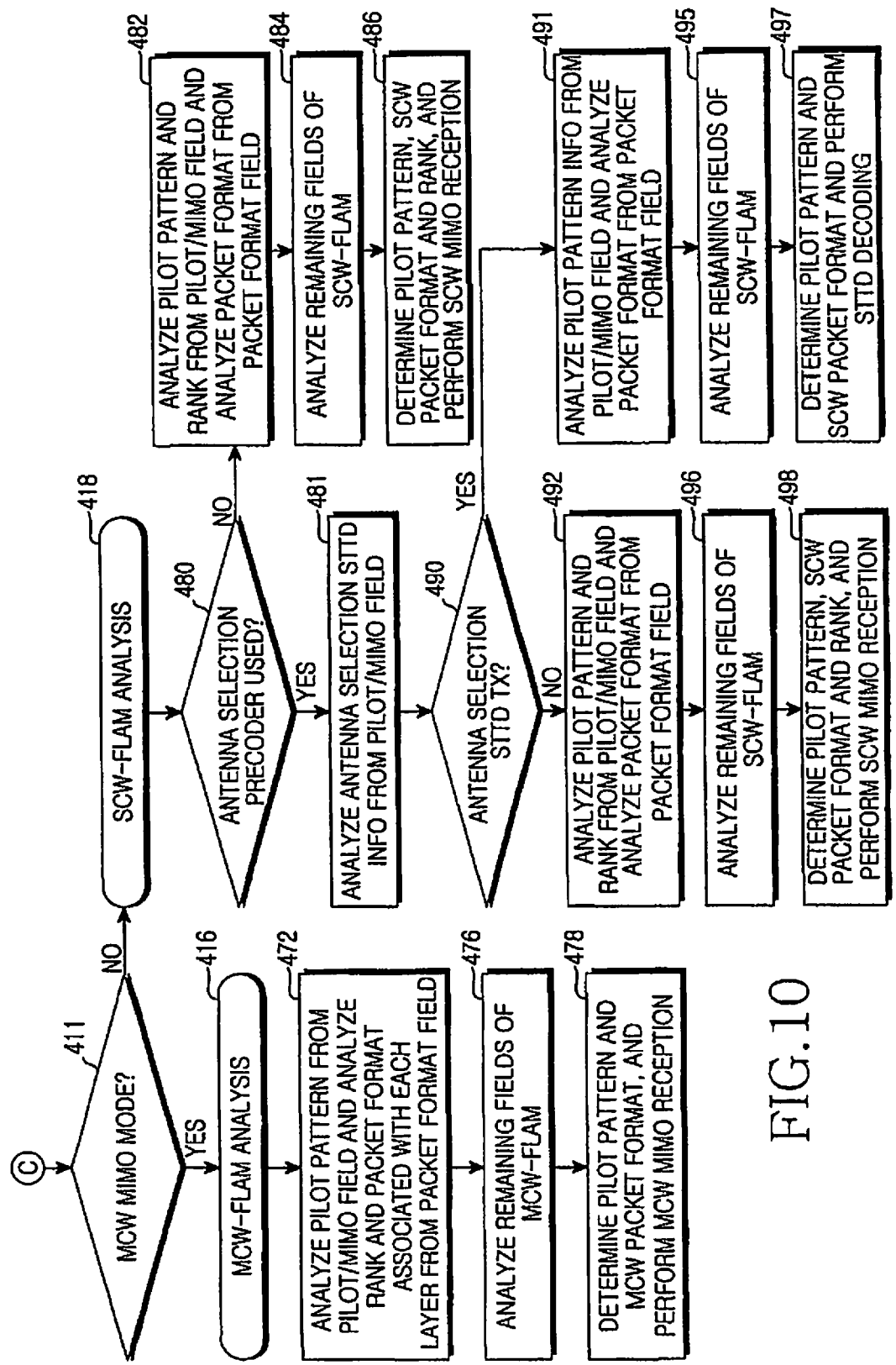

However, if it is determined in step 400 of FIG. 7 that the dedicated pilot is used, the terminal determines in step 411 of FIG. 10 whether the corresponding MIMO mode is the MCW MIMO mode or the SCW MIMO mode.

In the MCW MIMO mode where the terminal uses the dedicated pilot, the terminal starts analysis of MCW FLAM in step 416. In step 472, the terminal acquires pilot pattern information from a Pilot/MIMO field and acquires Rank and PF information associated with each layer from a PF field. In step 476, the terminal acquires information of the remaining MCW FLAM fields. Thereafter, in step 478, the terminal determines which pilot pattern and MCW MIMO PF it will use, and performs MCW MIMO reception based thereon.

In the SCW MIMO mode where the terminal uses the dedicated pilot, the terminal starts analysis of SCW FLAM in step 418. The terminal determines in step 480 whether it uses Antenna Selection precoding. If the terminal uses the Antenna Selection precoding, the terminal proceeds to step 481, and if the terminal uses non-Antenna Selection precoding, the terminal proceeds to step 482 where it acquires pilot pattern and Rank information from a Pilot/MIMO field and acquires PF information from a PF field. In step 484, the terminal acquires information of the remaining fields in the SCW FLAM. In step 486, the terminal performs SCW MIMO reception based on the pilot pattern, PF, and Rank information.

When the terminal uses the dedicated pilot and the Antenna Selection precoding, the terminal acquires in step 481 the information indicating whether the corresponding transmission is Antenna Selection STTD transmission or Antenna Selection precoding MIMO transmission, from the Antenna Selection STTD transmission bit in a Pilot/MIMO field. Thereafter, in step 490, the terminal determines whether the corresponding transmission is Antenna Selection STTD transmission. If the Antenna Selection STTD transmission bit is '1', it indicates Antenna Selection STTD transmission, and if the Antenna Selection STTD transmission bit is '0', it indicates Antenna Selection precoding MIMO transmission. When the corresponding transmission is Antenna Selection SCW MIMO transmission where the dedicated pilot is used, the terminal proceeds to step 492, and when the corresponding transmission is Antenna Selection STTD transmission where the dedicated pilot is used, the terminal proceeds to step 491.

When the corresponding transmission is Antenna Selection SCW MIMO transmission where the dedicated pilot is used, the terminal analyzes a pilot pattern and Rank from a Pilot/MIMO field and analyzes a PF from a PF field in step 492. In step 496, the terminal acquires information of the remaining fields in the SCW FLAM. Thereafter, in step 498, the terminal performs Antenna Selection SCW MIMO reception using the pilot pattern, SCW PF, and Rank.

When the corresponding transmission is Antenna Selection STTD transmission where the dedicated pilot is used, the terminal acquires pilot pattern information from a Pilot/MIMO field and acquires PF information from a PF field in step 491. In step 495, the terminal acquires information of the remaining fields in the SCW FLAM. In step 497, the terminal performs STTD decoding based on the pilot pattern and the PF information.

The foregoing embodiment secures 8 bits in the Pilot/MIMO field and describes how they are analyzed in several situations. The 8-bit information is needed is because 8 bits are required for notifying Rank while using the ready-made precoding. The ready-made precoding scheme is lower than the knockdown precoding scheme in terms of the freedom degree for column vector selection, so it needs to secure more precoding matrixes. Therefore, a large amount of information is assigned to the precoding matrix index. To reduce the number of bits secured for the Pilot/MIMO field, the following embodiments can be used.

A first embodiment assigns only 6 bits to the Pilot/MIMO field. There is no difference in the Pilot/MIMO field using method between this embodiment and the embodiment described in Table 2, except for the MIMO operation of using the common pilot and the ready-made precoding scheme. However, when the common pilot is used together with the ready-made precoding scheme, the Pilot/MIMO field is used only as the precoding matrix index. In this case, there is no space in which Rank information is written in an operation of the SCW MIMO mode. When the common pilot is used together with the ready-made precoding scheme, it is possible in the SCW MIMO mode to reduce the 2 bits to be used for Rank, by applying the restriction of using the Rank last reported by the terminal, instead of not writing Rank. With the introduction of the restriction, the base station can freely change the ready-made precoding scheme though it cannot perform MIMO transmission corresponding to the Rank value other than the Rank requested by the terminal.

A second embodiment assigns only 5 bits for the Pilot/MIMO field. There is no difference in the Pilot/MIMO field using method between this embodiment and the embodiment described in Table 2, except for the MIMO operation of using the common pilot and the ready-made precoding scheme. However, when the common pilot is used together with the ready-made precoding scheme, the Pilot/MIMO field is used only as the Rank information. That is, in the MCW MIMO mode, this embodiment sets all of 5 bits as a reversed value without separately notifying a particular precoding matrix. However, the embodiment applies the restriction of using the precoding matrix last reported by the terminal. Even in the SCW MIMO mode, the embodiment uses the 2 bits for Rank designation without separately notifying a particular precoding matrix, and sets the remaining 3 bits as a reversed value. Even in the SCW MIMO mode, the embodiment applies the restriction of using the precoding matrix last reported by the terminal. With the introduction of the restriction, the base station can apply a different Rank value from the value requested by the terminal though it cannot apply the precoding scheme other than the precoding requested by the terminal.

When 5 bits are assigned for the Pilot/MIMO field and the common pilot is used together with the ready-made precoding scheme as in the second embodiment, a further embodiment of setting the 5 bits as a reversed value regardless of the MCW MIMO mode or the SCW MIMO mode can be considered if the restriction based on the precoding and Rank requested by the terminal is introduced unconditionally.

With the introduction of the restriction in which the base station uses the intact MIMO-related information reported from the terminal as in the alternative embodiment, it is possible to efficiently reduce the amount of information in the Pilot/MIMO field. However, if the base station has failed to successfully receive the feedback information even though the terminal sent a request for a particular MIMO operation, the foregoing restriction cannot be applied. In this case, it is possible to solve the problem by switching to the transmit diversity or Single Input Single Output (SISO) transmission without applying the MCW MIMO or SCW MIMO transmission.

Even in the alternative embodiment, the information indicating the Antenna Selection STTD transmission can be inserted. When the common pilot is used, the universal matrix index, unused only for the SCW MIMO where Antenna Selection precoding is used, can be used as Antenna Selection STTD mode information. In the case where the dedicated pilot is used, if the 2-bit information indicating a pilot format and the 2-bit information indicating Rank are excluded, the first another embodiment has 2 spare bits and the second another embodiment has 1 spare bit. Of the spare bits, one bit is defined as Antenna Selection STTD mode information.

As is apparent from the forgoing description, the present invention can perform precoding using the message of the shared control channel and/or can deliver various types of pilot pattern information. Therefore, when the common pilot is used, the invention can notify which precoding is used, and when the dedicated pilot is used, the invention can notify which pilot pattern is used. In addition, the present invention can indicate the Antenna Selection STTD transmission in an external way using the message of the shared control channel. Such information transmission facilitates capacity improvement and efficient resource management.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving control information by a terminal, the method comprising:
   receiving a control channel message on a control channel;
   determining a dedicated pilot is used for data demodulation in a single codeword (SCW) mode; and
   extracting control information comprising a transmission rank, information about the dedicated pilot, and information about an antenna selection indicating which antenna is selected from the control channel message.

2. The method of claim 1, wherein the control information further comprises information about a scrambling identity.

3. The method of claim 1, wherein the control channel message further comprises information about a modulation order and coding rate and information indicating an assigned resource.

4. The method of claim 1, wherein the control channel message further comprises identity information of the terminal.

5. A method for transmitting a control channel message by a base station, the method comprising:
   determining a dedicated pilot is used for data demodulation in a single codeword (SCW) mode;
   generating control information comprising a transmission rank, information about the dedicated pilot, and information about an antenna selection indicating which antenna is selected; and
   transmitting a control channel message comprising the control information.

6. The method of claim 5, wherein the control information further comprises information about a scrambling identity.

7. The method of claim 5, wherein the control channel message further comprises information about a modulation order and coding rate and information indicating an assigned resource.

8. The method of claim 5, wherein the control channel message further comprises identity information of the terminal.

9. An apparatus for receiving control information, the apparatus comprising:
a transceiver configured to receive a control channel message on a control channel; and
a controller configured to:
determine a dedicated pilot is used for data demodulation in a single codeword (SCW) mode, and
extract control information comprising a transmission rank, information about the dedicated pilot, and information about an antenna selection indicating which antenna is selected from the control channel message.

10. The apparatus of claim 9, wherein the control information further comprises information about a scrambling identity.

11. The apparatus of claim 9, wherein the control channel message further comprises information about a modulation order and coding rate and information indicating an assigned resource.

12. The apparatus of claim 9, wherein the control channel message further comprises identity information of a terminal.

13. An apparatus for transmitting a control channel message, the apparatus comprising:
a controller configured to:
determine a dedicated pilot is used for data demodulation in a single codeword (SCW) mode, and
generate control information comprising a transmission rank, information about the dedicated pilot, and information about an antenna selection indicating which antenna is selected; and
a transceiver configured to transmit the control channel message including the control information.

14. The apparatus of claim 13, wherein the control information further comprises information about a scrambling identity.

15. The apparatus of claim 13, wherein the control channel message further comprises information about a modulation order and coding rate and information indicating an assigned resource.

16. The apparatus of claim 13, wherein the control channel message further comprises identity information of a terminal.

* * * * *